US007341511B2

(12) United States Patent
Fiden et al.

(10) Patent No.: US 7,341,511 B2
(45) Date of Patent: Mar. 11, 2008

(54) GAMING TERMINAL HAVING AN ELEMENT MOVEABLE ALONG A NONLINEAR PATH FOR INDICATING A GAME OUTCOME

(75) Inventors: Daniel P. Fiden, Chicago, IL (US); Lisa M. Helfer, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 516 days.

(21) Appl. No.: 10/761,581

(22) Filed: Jan. 21, 2004

(65) Prior Publication Data

US 2005/0159209 A1 Jul. 21, 2005

(51) Int. Cl.
*A63F 13/00* (2006.01)

(52) U.S. Cl. ........................................................ 463/16

(58) Field of Classification Search ............ 463/30–32, 463/46–47, 16–22; 273/143 R
See application file for complete search history.

(56) References Cited

U.S. PATENT DOCUMENTS

| | | | | |
|---|---|---|---|---|
| 2,992,598 | A * | 7/1961 | Einfalt | 446/444 |
| 5,788,573 | A | 8/1998 | Baerlocher et al. | 463/16 |
| 5,823,874 | A | 10/1998 | Adams | 463/17 |
| 6,024,642 | A * | 2/2000 | Stupak | 463/20 |
| 6,270,411 | B1 | 8/2001 | Gura et al. | 463/20 |
| 6,315,660 | B1 | 11/2001 | DeMar et al. | 463/16 |
| 6,322,309 | B1 | 11/2001 | Thomas et al. | 413/20 |
| 6,368,216 | B1 * | 4/2002 | Hedrick et al. | 463/20 |
| 6,537,152 | B2 * | 3/2003 | Seelig et al. | 463/30 |
| 6,602,136 | B1 * | 8/2003 | Baerlocher et al. | 463/16 |
| 6,758,473 | B2 * | 7/2004 | Seelig et al. | 273/143 R |
| 6,893,344 | B2 * | 5/2005 | Brown et al. | 463/25 |
| 2002/0016200 | A1 * | 2/2002 | Baerlocher et al. | 463/20 |
| 2004/0110555 | A1 * | 6/2004 | Devaull et al. | 463/20 |
| 2004/0147300 | A1 * | 7/2004 | Seelig et al. | 463/1 |
| 2005/0075167 | A1 * | 4/2005 | Beaulieu et al. | 463/32 |

FOREIGN PATENT DOCUMENTS

| | | | |
|---|---|---|---|
| GB | 2 096 376 | 10/1982 | 17/34 |
| JP | 10165569 A * | 6/1998 | |

OTHER PUBLICATIONS

"Jungle King A.C. Coin and Slot" product information sheet—Strictly Slots; p. 41 (Mar. 1999).
"Empire A.C. Coin and Slot" product information sheet—Strictly Slots; p. 40 (Dec. 1998).
"Bally Gaming and Systems" product information sheet—Strictly Slots; p. 52 www.casinocenter.com (Jan. 2003).

* cited by examiner

*Primary Examiner*—Kim Nguyen
(74) *Attorney, Agent, or Firm*—Nixon Peabody LLP

(57) ABSTRACT

A gaming terminal for conducting a wagering game. The gaming terminal includes an input device for receiving a wager input from a player of the gaming terminal. A display is provided for displaying a game outcome randomly selected from a plurality of game outcomes in a basic game including a start bonus game outcome in response to receiving the wager input. The basic game includes a nonlinear path extending in three dimensions and at least one movable element for representing a bonus game outcome. The moveable element moves along the nonlinear path in response to the start bonus game outcome being selected in the basic game.

32 Claims, 4 Drawing Sheets

GAMING TERMINAL HAVING AN ELEMENT MOVEABLE ALONG A NONLINEAR PATH FOR INDICATING A GAME OUTCOME

FIELD OF THE INVENTION

The present invention relates generally to gaming machines and, more particularly, to a gaming terminal having an element moveable along a nonlinear path for representing a game outcome.

BACKGROUND OF THE INVENTION

Gaming machines, such as slot machines, video poker machines and the like, have been a cornerstone of the gaming industry for many years. Generally, the popularity of such machines with players is dependent on the likelihood (or perceived likelihood) of winning money at the gaming machine and the intrinsic entertainment value of the machine relative to other available gaming options. Where the available gaming options include a number of competing machines and the expectation of winning on each machine is roughly the same (or believed to be the same), players are most likely to be attracted to the most entertaining and exciting machines. Shrewd operators constantly strive to employ the most entertaining and exciting machines available, because such machines attract frequent play and hence increase profitability to the operator.

One method of attracting players to gaming machines is by providing a visual indicator of a potential payout or a visual indicator of a winning outcome. For example, slot machines have reels with a plurality of symbols displayed thereon that rotate to align the symbols relative to a payline according to one of a plurality of different outcomes. As the spinning reels slowly come to rest, the player begins to anticipate the outcome, which increases the entertainment provided to the player of the gaming machine.

Other methods of attracting players to gaming machines is by providing a bonus game in addition to a basic game. Generally, bonus games provide a greater expectation of winning than the basic game alone and may be accompanied with more attractive or unusual features including visual features, audible features, or both. An example of a gaming machine having a unique visual payout indicator is disclosed in U.S. patent application Ser. No. 10/341,110, entitled "Gaming Machine Having a Pendulum-Based Payout Indicator," which was filed on Jan. 13, 2003 and is assigned to the assignee of the present application. Another example of a gaming machine having a unique visual payout indicator is disclosed in U.S. patent application Ser. No. 10/442,389, entitled "Gaming Machine Having a Plurality of Moveable Elements for Indicating a Game Outcome," which was filed on May 20, 2003 and is assigned to the assignee of the present application. Because the visual payout indicator and the bonus game concepts have tremendous advantages in terms of player appeal and excitement relative to other known games, and because such games are attractive to both players and operators, there is a continuing need to develop gaming machines and gaming terminals with new types of bonus games, visual indicators, or both, to satisfy the demands of players and operators.

SUMMARY OF THE INVENTION

A gaming terminal for conducting a wagering game comprises an input device for receiving a wager input from a player of the gaming terminal, a display for displaying a game outcome randomly selected from a plurality of game outcomes in a basic game including a start bonus game outcome in response to receiving the wager input, a nonlinear path extending in three dimensions, a at least one movable element for representing a bonus game outcome. The at least one moveable element moves along the nonlinear path in response to the start bonus game outcome being selected in the basic game.

The above summary of the present invention is not intended to represent each embodiment, or every aspect, of the present invention. This is the purpose of the figures and the detailed description that follow.

Figure 1:
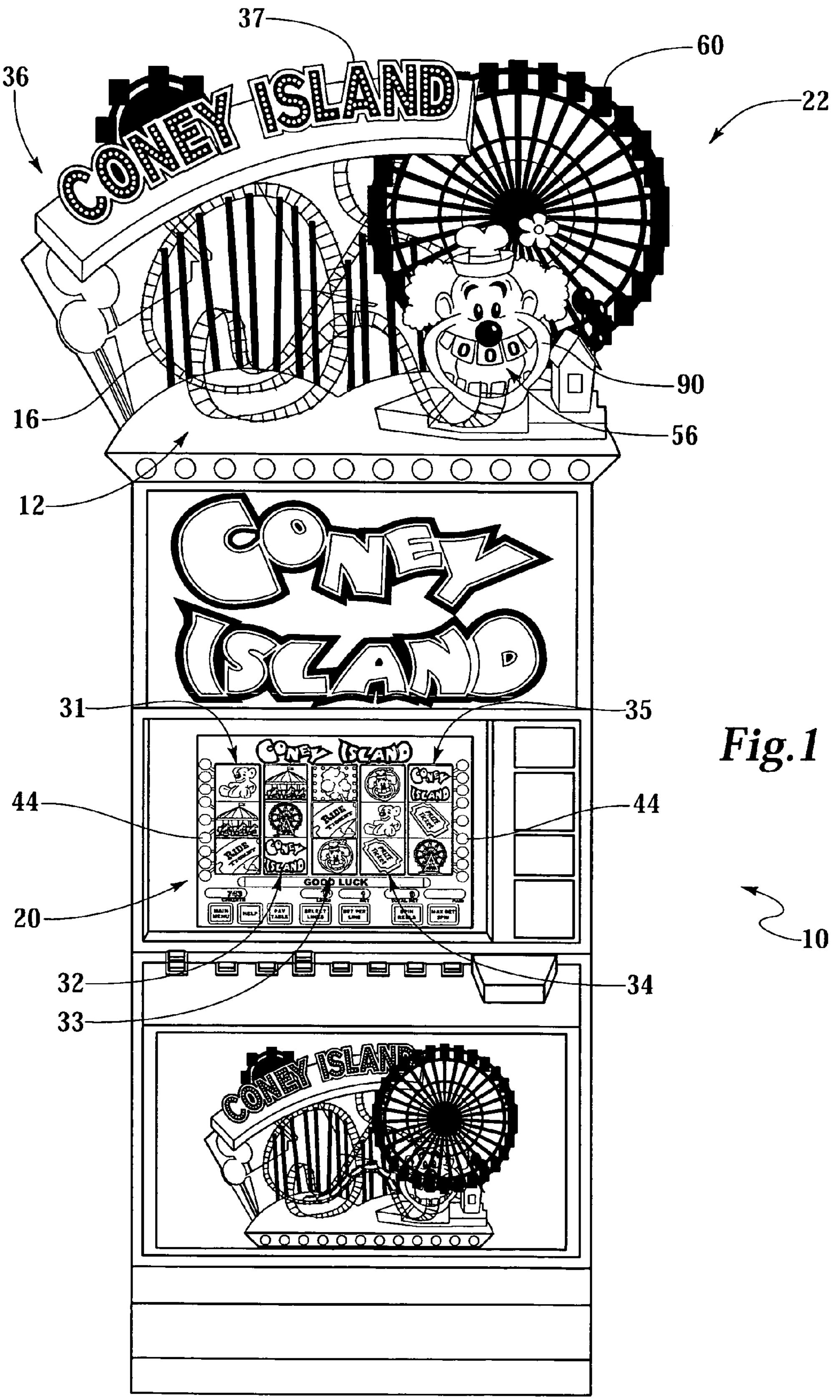
FIG. 1 is a perspective view of a gaming machine having an element moveable along a nonlinear path for representing a game outcome according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF THE ILLUSTRATED EMBODIMENTS

Generally, the present invention is directed to gaming machines having one or more elements moveable along a nonlinear path for representing a game outcome. For example, according to one embodiment of the present invention, an element moveable along a nonlinear path comprises one or more rollercoaster cars that move along a nonlinear rollercoaster track as is described in detail below. Alternatively, the element moveable along a nonlinear path may comprise one or more vehicles that move along a winding road.

Turning to the drawings and referring initially to FIG. 1, there is depicted a gaming machine 10 having an element moveable along a nonlinear path for representing a game outcome. The illustrated gaming machine 10 is a reel-slot-type gaming machine; however, the present invention is applicable to other types of gaming machines such as, for example, video poker machines. In the embodiment of the present invention illustrated in FIG. 1, the element moveable along a nonlinear path is a rollercoaster 12 comprising a plurality of rollercoaster cars 14 (FIG. 4) and a nonlinear rollercoaster track 16 upon which the plurality of cars 14 move. The rollercoaster cars 14 are movably engaged to the rollercoaster the track 16, or the engagement may be simulated. The rollercoaster 12, the cars 14, and track 16 may be actual mechanical components, electromechanical components, simulated on a video display, or a combination thereof in alternative embodiments of the present invention.

The track 16 is nonlinear and comprises a plurality of twists, turns, loops, rises, and drops. In the illustrated embodiment, the track 16 extends in three dimensions, and forms a continuous loop. In other embodiments, the track 16 may be nonlinear, but only extends in two dimensions. Alternatively, the track 16 can be of a variety of different shapes and may include twists, turns, loops, rises, drops, or a combination thereof. Alternatively still, the track 16 may have one end at a location different than another end such that the track 16 does not form a continuous loop.

The gaming machine 10 includes a video display 20 and a top box unit 22 for playing both a "basic" game and a secondary or "bonus" game, respectively, according to one embodiment of the present invention. The depicted gaming machine 10 comprises an upright machine in which the video display 20 is generally vertical. It will be appreciated, however, that any of several other models of gaming machines are within the scope of the present invention such as, for example, a slant-top version in which the video display 20 is generally vertically angled towards a player of the gaming machine. The video display 20 may comprise a cathode ray tube (CRT) display, a liquid crystal display (LCD), a plasma display, or generally any other type of video display known in the art. The video display 20 has five spinning reels 31-35 displayed thereon. Alternatively, mechanical reels rather than displayed-simulated reels may be used as is known in the art. The top box unit 22 of the gaming machine 10 also includes a marquee 36, having marquee lights 37, that is indicative of a theme of the gaming machine 10 for attracting players.

Figure 2:
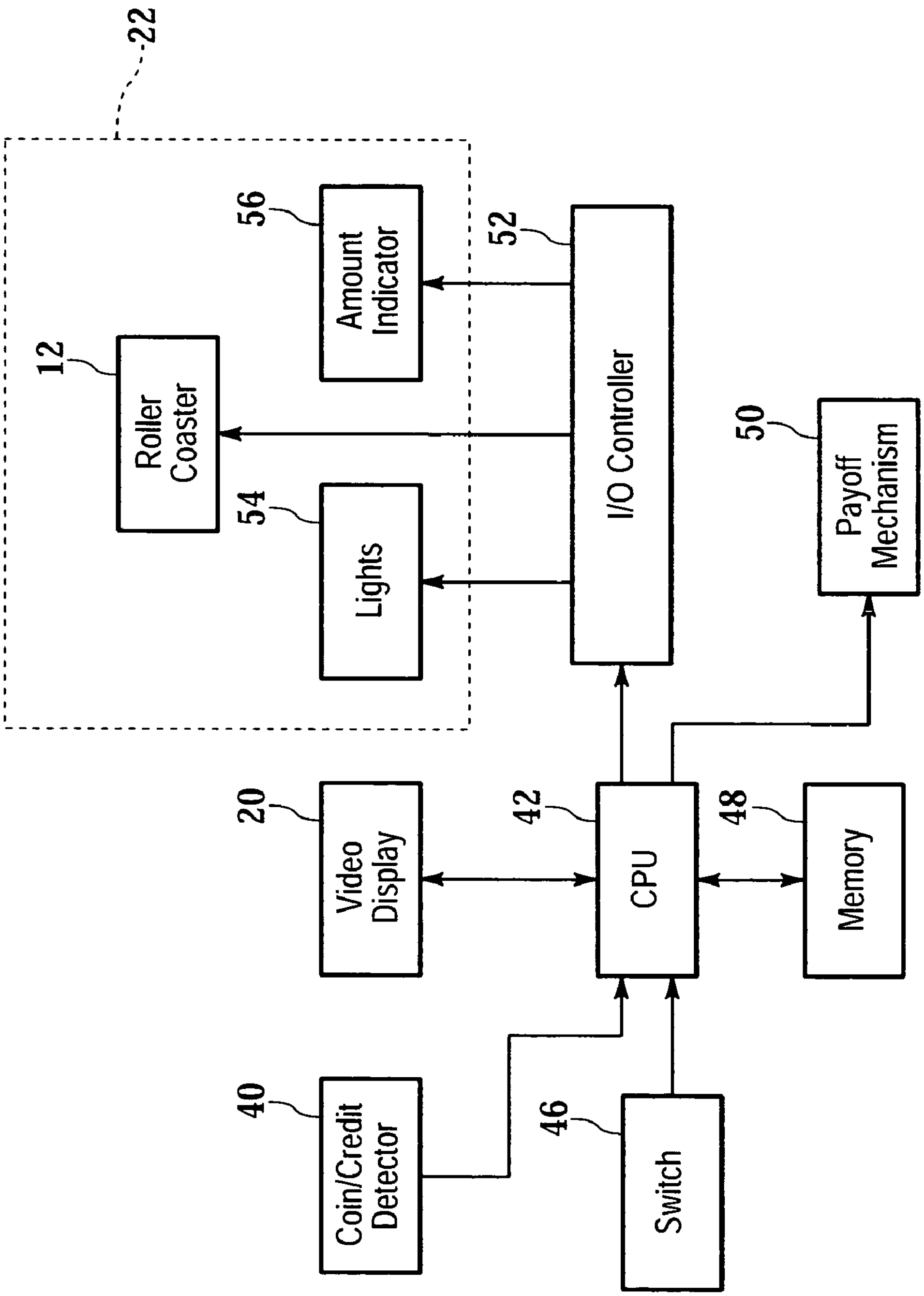
FIG. 2 is a control system for operating the gaming machine of FIG. 1.

Referring also to FIG. 2, a control system for operating the gaming machine 10 is illustrated according to one embodiment of the present invention. A coin/credit detector 40 signals a central processing unit (CPU) 42 when a player has inserted a number of coins or has played a number of credits. The CPU 42 operates to execute a basic game program causing the video display 20 to display the basic game which includes the simulated spinning reels 31-35 with symbols displayed thereon.

Game play is initiated by a player inserting a number of coins into the "slot," inserting one or more currency bills into a bill accepting mechanism, or playing a number of credits, causing the CPU 42 to activate one or more paylines on the display 20. The number of activated paylines correspond to the number of credits played according to one embodiment. Payline indicators 44 are displayed on both sides of the reels 31-35. For example, payline indicators **44*a* and 44*b* indicate an activated horizontal center payline extending between payline indicators 44*a* and 44*b* in FIG. 3. The basic game commences in response to the player activating a switch 46 (e.g., by pulling a lever or by pressing a button). Once the player activates the switch 46, the CPU 42 sets the reels 31-35 in motion on the video display 20, randomly selects a game outcome from a plurality of possible game outcomes stored in the memory 48, and then stops the reels 31-35 relative to an activated payline to display the symbols on the reels 31-35** according to the randomly selected game outcome.

A system memory 48 stores control software, operational instructions, and data associated with the gaming machine 10. A payoff mechanism 50 is operable in response to instructions from the CPU 42 to award a payoff of coins or credits to the player in response to certain winning outcomes, which may occur in the basic game or a bonus game, in accordance with a pay table stored in the system memory 48. A separate input/output (I/O) controller 52 is coupled to the CPU 42 and operates the various features of the top box unit 22 including top box lights 54 (which may include the marquee lights 37), a payoff-amount indicator 56, and the rollercoaster 12. Additional top-box-unit components such as a Ferris wheel 60, audio components, and other lighting elements may also be coupled to and controlled by the I/O controller 52. The top box lights 54, the payoff-amount indicator 56, the rollercoaster 12, the Ferris wheel 60, or a combination thereof may comprise physical, mechanical and/or electromechanical components, or may be simulated on a video display of the top box unit 22 in alternative embodiments of the present invention.

While the gaming machine 10 has been described as having the CPU 42 as being an integral component (e.g., located within the cabinet of the gaming machine 10), the CPU or game controller for the gaming machine 10 may be separate from (e.g., located outside) the gaming machine 10 in alternative embodiments of the present invention. In some applications, one or more gaming machines 10 or gaming terminals do not have an integral CPU and may be controlled by a remote game controller. The remote game controller may be located at the particular casino where the gaming machines are located or may be located offsite.

Figure 3:
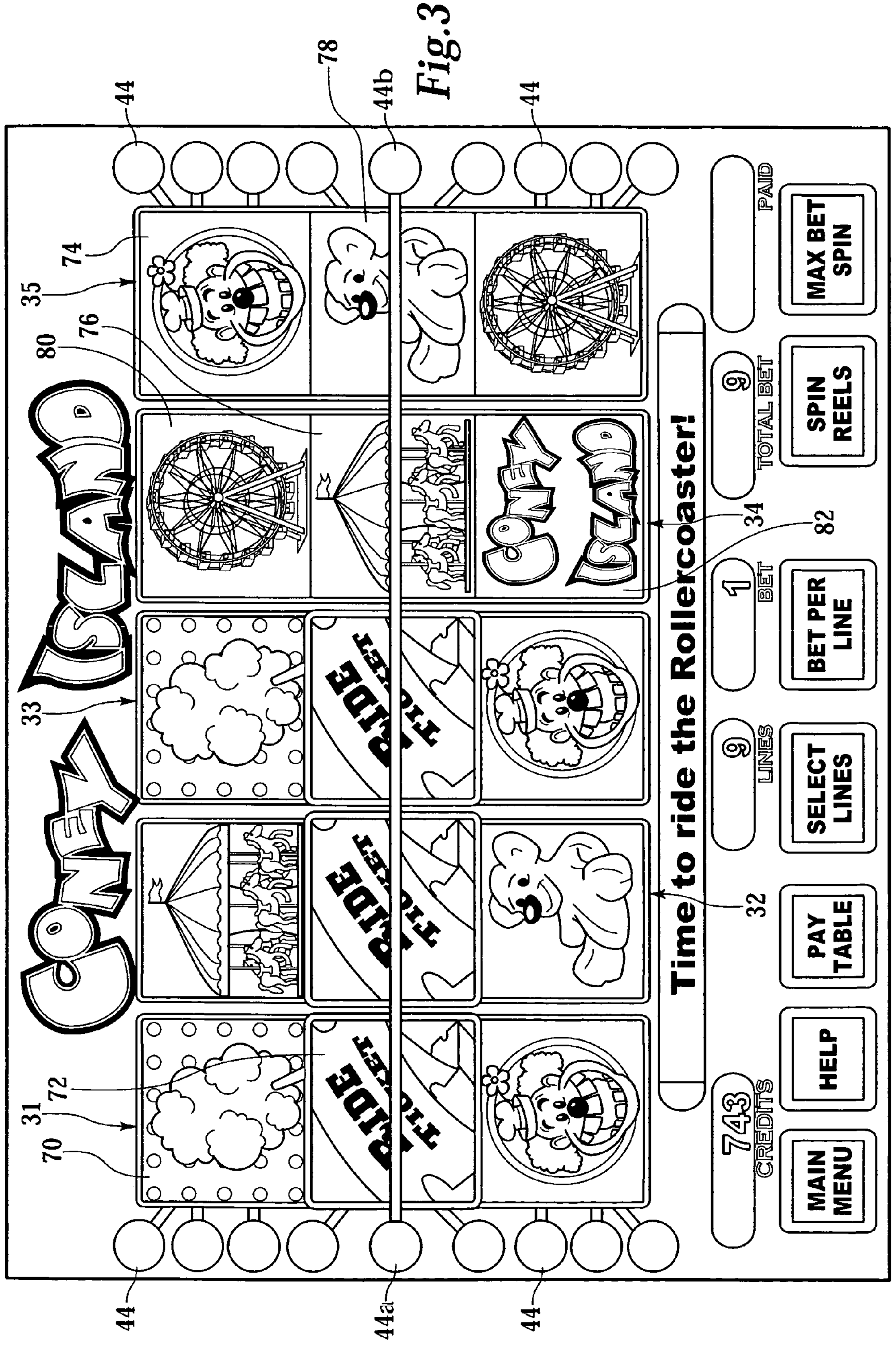
FIG. 3 is an enlarged view of the reels of the gaming machine of FIG. 1.

Referring also to FIG. 3, an enlarged portion of the video display 20 is shown. According to the depicted embodiments, the video display 20 includes five reels 31-35 having symbols displayed thereon and one activated payline extending between payline indicators **44*a* and 44*b*. The depicted symbols on the reels 31-35 include "COTTON CANDY" symbols 70, "RIDE TICKET" symbols 72, "CLOWN" symbols 74, "CAROUSEL" symbols 76, "TEDDY BEAR" symbols 78, "FERRIS WHEEL" symbols 80, and "CONEY ISLAND" symbols 82. As is apparent from the foregoing symbols 70-82 and from the marquee 36 (FIG. 1), the gaming machine 10 has an amusement park theme-specifically, the Coney Island amusement park. In other embodiments of the present invention, the gaming machine 10 may portray other themes with corresponding like-themed reel symbols. Further, standard gaming symbols such as "1-BAR" symbols, "2-BAR" symbols, "3-BAR" symbols, "CHERRY" symbols, "SEVEN" symbols, and "BELL" symbols may be depicted on the reels 31-35** in other embodiments.

A winning combination occurs when the symbols appearing on the reels 31-35 correspond to one of the winning symbol combinations listed in a pay table stored in the memory 48 of the gaming machine 10. Such winning combinations are displayed relative to one or more paylines. The activated paylines extend between activated pairs of payline indicators 44 such as, for example, the payline that extends between payline indicators **44*a* and 44*b*. Winning combinations listed in the pay table can include three like-symbols appearing on a payline yielding a first payout, and four like-symbols appearing on a payline yield a second, larger payout. For example, three COTTON CANDY symbols 70 appearing on a payline yields five credits, and four TEDDY BEAR symbols 78 appearing on a payline yields fifteen credits. The symbol types may be weighted according to the frequency at which they appear on the reels 31-35. For example, three CAROUSEL symbols 76 on a payline yields twenty credits whereas three FERRIS WHEEL symbols 80 on a payline yields thirty credits. Other symbol types such as, for example, the CONEY ISLAND symbols 82** may represent wild symbols that are combined with two other symbols to complete a winning combination of symbols as reflected in the pay table.

Other schemes are implemented in various embodiments such as varying the winning amount for a particular symbol combination according to the particular payline with which the symbol combination is aligned. For example, three CAROUSEL symbols 76 aligned with the first payline 44a-44b may yield twenty credits, while three CAROUSEL symbols 76 aligned with a second or third payline may yield one hundred credits. Many other symbol combinations relative to the plurality of paylines and corresponding payouts are listed in the pay table stored in the memory 48 of the gaming machine 10.

Other outcomes cause the CPU 42 to initiate a bonus game and the CPU 42 switches from operating in a basic mode to operating in a bonus mode. For example, as illustrated in FIG. 3, the CPU 42 initiates a bonus game when three or more RIDE TICKET symbols 72 are displayed on the video display 20, or are displayed on the video display 20 along a payline. Alternatively, a bonus game is triggered when one or more bonus-game-triggering symbols are displayed on specific feels 31-35 and are aligned with a payline—e.g., RIDE TICKET symbols 72 appearing on the first, second, and third reels 31-33 are aligned with the activated payline 44a-44b. Alternatively, the CPU 42 only initiates the bonus game when a player has wagered a predetermined number of credits (e.g., the maximum number of credits), and one or more bonus-game-triggering symbols are aligned on specific reels 31-35, aligned along specific paylines, or both. The latter embodiment encourages players to wager the maximum number of credits. One or more of many different combinations of symbols 70-82, reels 31-35, paylines, number of credits wagered, or combinations thereof may be used to trigger the bonus round. The bonus game generally supplements the payoff in the pay table corresponding to the symbol combination on the reels.

Figure 4:
FIG. 4 is an enlarged view of the top box unit of the gaming machine of FIG. 1.

Turning now to FIG. 4, the CPU 42 activates the top box unit 22 of the gaming machine 10 upon initiation of the bonus game. Generally, in the bonus round, the cars 14 move along the track 16 of the rollercoaster 12, and the amount paid in the bonus round (e.g., the "bonus payoff") is related to the movement of the cars 14. In the bonus round, the bonus payoff is randomly determined by the CPU 42, or is randomly selected by the CPU 42 from a plurality of possible bonus game outcomes listed in a bonus-game-outcome pay table, which is stored in the memory 48. Upon selection of the bonus game outcome, the CPU 42 directs the I/O controller 52 to operate the rollercoaster 12 in accordance with the CPU's 42 selection. To attract the player's attention to the top box unit 22, the display 20 of the gaming machine 10 that displays the basic game may be dimmed. As previously discussed, the top box unit 22 is amusement park themed according to the depicted embodiment and includes the Coney Island marquee 36. The amusement park themed components of the top box unit 22 also include the rollercoaster 12, the Ferris wheel 60, a clown-type figure 90 which includes a bonus amount indicator 56 that is displayed on the clown's 90 teeth, and the background art of the top box unit 22. The amusement park themed components of the top box unit 22 may comprise physical components, mechanical components, electromechanical components, may be simulated on a video display of the top box unit 22, or may be comprised of a combination thereof. For example, the rollercoaster 12 comprises a physical track 16 along which physical cars 14 ride according to one embodiment. Movement is provided to the cars 14 by a cable (not shown) that engages one or more of the cars 14, which are mechanically coupled together. The cable comprises a continuous loop that runs beneath the track 16 similar to a conventional rollercoaster and is driven by one or more driven rollers (not shown) coupled to one or more motors (not shown) controlled by the I/O controller 52.

As indicated above, the bonus game payout (i.e., the number of credits awarded in the bonus round) is related to the movement of the rollercoaster 12. For example, each complete cycle of the cars 14 around the track 16 of the rollercoaster 12 may represent a specific payout amount—one cycle of the cars 14 around the track 16 may represent a payout of 250 credits, two cycles of the cars 14 represents 500 credits, and three cycles represents 750 credits, etc. Alternatively, the payout progression may be nonlinear, or exponential, in nature such that the payout dramatically compounds (e.g., doubles, triples, etc.) with each cycle of the cars 14 around the track 16. The particular movement of the rollercoaster 12 corresponding to each possible bonus game outcome (e.g., two cycles for a payout of 500 credits) is stored in memory. Upon random selection of a bonus game outcome, the CPU 42 sends information from the memory 48 to the I/O controller 52 for operating the rollercoaster 12 in a manner indicative of the selected bonus game outcome.

In an alternative embodiment of the present invention, the bonus game payout (i.e., the number of credits awarded in the bonus round) is related to length of time that the rollercoaster 12 is moving along the track 16. The cars 14 of the rollercoaster 12 are set in motion in response to a bonus-game-triggering outcome in the basic game. The passage of a predetermined amount of time (e.g., 1, 3, 5, or 10 seconds) during which the cars 14 are moving may represent the award of a specific amount of credits. For example, a payoff of 25 credits may be awarded for every 5 seconds during which the cars 14 move along the track 16.

The top box unit 22 includes the clown 90, which includes a plurality of teeth. The bonus payoff amount indicator 56 is displayed on the clown's 90 teeth. Five upper teeth are shown that are capable of displaying a number five digits in length. More clown teeth are included for displaying a number of greater length, if necessary. According to one embodiment of the present invention, the running of the indicator 56 is synchronized with the movement of the rollercoaster 12. For example, as discussed above, each cycle of the rollercoaster 12 may represent a payout of a specific number of credits such as 250 credits. During one cycle of the rollercoaster 12, the indicator 56 increases from 0 to 250 credits. The indicator 56 moves when the rollercoaster cars 14 move, which allows the game player to watch the bonus payout award increase, adding to the excitement of the game for the player.

The CPU 42 directs the I/O controller 52 to operate the top box unit 22, including the rollercoaster 12 and the marquee lights 37, as well as to output audible signals and other lighting consistent with the amusement park theme. For example, the gaming machine 10 may output sounds simulating carnival music. In addition to the marquee lights 37, other lighting for the top box unit 22 may include lighting (e.g., back lighting) for the rollercoaster 12, the Ferris wheel 60, the clown 90, and for the art work displayed on the top box unit 22. When the gaming machine 10 is not in use (i.e., not being played by a player), the CPU 42 causes the gaming machine 10 to enter an attract mode. In the attract mode, the CPU 42 directs the I/O controller 52 to operate the top box unit 22 in a predetermined fashion by flashing the lights and outputting sounds designed to attract players to the gaming machine 10.

The operation of the gaming machine 10 is described according to one embodiment of the present invention. Three RIDE TICKET symbols 72 aligned with an activated payline on the video display 20 in the basic game triggers the bonus round as is shown in FIG. 3. Once the bonus round is triggered, the CPU 42 randomly selects a bonus game outcome from a plurality of possible bonus game outcomes. The CPU 42 then directs the I/O controller 52 to begin moving the cars 14 along the track 16 of the rollercoaster 12. The movement of the cars 14 along the track 16 is related to the selected bonus game outcome. Thus, the I/O controller 52 moves the cars 14 in accordance with the selected game outcome. For example, if the selected bonus game outcome is an award of 250 credits and each cycle of the cars 14 around the track 16 represents 125 credits, the I/O controller 52 moves the cars 14 around the track 16 twice. While the I/O controller 52 is moving the cars 14, the I/O controller 52 increments the bonus payoff amount indicator 56. The I/O controller 52 coordinates the incrementing of the indicator 56 and the movement of the cars 14 such that the indicator 56 displays an amount corresponding to the selected bonus payoff amount when the movement of the cars 14 is stopped. Alternatively or additionally, the various parameters for controlling the indicator 56 and the rollercoaster 12 (e.g., timing, number of cycles, rates, etc.) for each of the possible bonus game outcomes listed in the above-described bonus-game-outcome pay table are listed in a table stored in a memory that is accessed by the I/O controller 52 for controlling the indicator 56 and the rollercoaster 12.

After the I/O controller 52 stops the cars 14, and the indicator 56 displays the bonus game award, the CPU 42 operates the payoff mechanism 50 to award a payoff of coins or credits to the player in response to the bonus game outcome. For example, if the indicator displays "250," as shown in FIG. 4, a payoff of two-hundred fifty credits is awarded to the player.

Additionally, movement of the Ferris wheel 60 is indicative of a bonus game payout in an alternative embodiment of the present invention. In a bonus game, rotation of the Ferris wheel 60 may indicate an increased bonus award beyond that displayed on the amount indicator 56. Movement of the Ferris wheel 60 may add a fixed number of credits to the bonus payoff. Or, rotation of the Ferris wheel 60 may represent a multiplier (e.g., two-, three-, or four-times) for increasing the bonus payoff such that the bonus game payout is doubled or tripled for two or three revolutions, respectively, of the Ferris wheel 60.

Alternatively or additionally, the rollercoaster 12 is used to indicate a multiplier. The cars 14 of the rollercoaster 12 may bear different colors or symbols (e.g., 2×, 3×, 4×, etc.), including illuminated symbols, to indicate whether a multiplier has been awarded in the basic game or in the bonus game. Further, the number of cycles of the cars 14 around the nonlinear track 16 of the rollercoaster 12 may represent an award of a multiplier.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A gaming terminal for conducting a wagering game, comprising:

an input device for receiving a wager input from a player of the gaming terminal;

a display for displaying a game outcome randomly selected from a plurality of game outcomes in a basic game including a start bonus game outcome in response to receiving the wager input;

a physical nonlinear path extending in three dimensions; and at least one physical movable element for representing a bonus game outcome, the at least one physical moveable element moving along the physical nonlinear path in response to the start bonus game outcome being selected in the basic game.

2. The gaming terminal of claim 1 wherein the gaming terminal has an amusement park theme.

3. The gaming terminal of claim 2 wherein the physical nonlinear path comprises a rollercoaster track, and the at least one physical moveable element comprises at least one rollercoaster car.

4. The gaming terminal of claim 3 wherein the at least one rollercoaster car comprises a plurality of rollercoaster cars.

5. The gaming terminal of claim 1 wherein the at least one physical moveable element comprises a plurality of physical moveable elements.

6. The gaming terminal of claim 1 wherein the movement of the at least one physical moveable element along the physical nonlinear path represents a payout corresponding to the selected game outcome.

7. The gaming terminal of claim 6 wherein the physical nonlinear path includes a starting point and an ending point, and movement of the at least one physical moveable element along the physical nonlinear path from the starting point to the ending point represents a payout of a predetermined amount.

8. The gaming terminal of claim 7 wherein multiple cycles of the at least one physical moveable element along the nonlinear path from the starting point to the ending point represents multiple payouts of the predetermined amount.

9. The gaming terminal of claim 7 wherein the starting point is adjacent to the ending point such that the physical nonlinear path forms a continuous loop.

10. The gaming terminal of claim 9 wherein the selected bonus game outcome includes a payout amount.

11. The gaming terminal of claim 10 further including a payout amount indicator for displaying the payout amount.

12. The gaming terminal of claim 11 wherein the payout indicator is adapted to increment from a first value to a second value, the second value corresponding to the payout amount.

13. The gaming terminal of claim 12 wherein the incrementing of the payout indicator commences upon movement of the at least one physical moveable element from the starting point, the incrementing of the payout indicator terminating upon termination of the movement of the at least one physical moveable element.

14. The gaming terminal of claim 11 wherein the payout indicator increments for the length of time that the at least one physical movable element is moving along the nonlinear path.

15. The gaming terminal of claim 1 further including a memory for storing the plurality of possible game outcomes and information corresponding to the movement of the at least one physical movable element along the nonlinear path for each of the plurality of possible game outcomes.

16. The gaming terminal of claim 1 further comprising a central processing unit for randomly selecting the game outcome from the plurality of game outcomes in the basic game, the central processing unit being integral to the gaming terminal.

17. The gaming terminal of claim 1 further comprising a central processing unit for randomly selecting the game outcome from the plurality of game outcomes in the basic game, the central processing unit being located outside of the gaming terminal.

18. A method of conducting a wagering game on a gaming terminal in a basic game mode and a bonus game mode, the gaming terminal having a physical nonlinear path along which the at least one physical element is moveably engaged for representing a game outcome, the method comprising:

receiving a wager from a player of the gaming terminal;

conducing the wagering game pursuant to the basic game mode;

selecting a basic game outcome from a plurality of possible basic game outcomes that include a start bonus game outcome;

conducting the wagering game pursuant to the bonus game mode in response to the start bonus game outcome being selected;

selecting a bonus game outcome from a plurality of possible bonus game outcomes when conducting the wagering game pursuant to the bonus game mode; and moving the at least one physical element along the physical nonlinear path, the moving being indicative of the selected bonus game outcome.

19. The method of claim 18 wherein the movement of the at least one physical element along the physical nonlinear path represents a bonus game payout corresponding to the selected bonus game outcome.

20. The method of claim 18 wherein the gaming terminal includes a bonus game payout indicator.

21. The method of claim 20 comprising: displaying the selected bonus game outcome with the bonus game payout indicator; and incrementing the bonus game payout indictor while moving the at least one physical element along the physical nonlinear path.

22. A method of conducting a wagering game on a gaming terminal, the gaming terminal having a physical nonlinear path along which at least one physical element is moveably engaged for representing a game outcome, the method comprising:

receiving a wager from a player of the gaming terminal;

selecting a game outcome from a plurality of possible game outcomes; and moving the at least one moveable physical element along the physical nonlinear path for representing the selected game outcome.

23. The method of claim 22 wherein selecting a game outcome further comprises selecting information regarding movement of the at least one moveable element along the nonlinear path.

24. The method of claim 22 wherein the gaming terminal has an amusement park theme.

25. The method of claim 22 wherein the at least one moveable physical element comprises a plurality of elements, and the moving further comprises moving the plurality of elements along the physical nonlinear path for representing the selected game outcome.

26. The method of claim 22 wherein the movement of the at least one moveable physical element along the physical nonlinear path represents a payout corresponding to the selected game outcome.

27. The method of claim 26 wherein the nonlinear path includes a starting point and an ending point, and moving the at least one moveable physical element along the physical nonlinear path from the starting point to the ending point represents a payout of a predetermined amount.

28. The method of claim 27 wherein moving the at least one moveable physical element along the physical nonlinear path from the starting point to the ending point comprises a cycle, each cycle of the at least one moveable physical element representing a predetermined amount.

29. The method of claim 22 wherein selecting a game outcome comprises selecting a game payout amount.

30. The method of claim 22 wherein the gaming terminal includes a game payout indicator, the method further comprising displaying the selected game outcome with the game payout indicator.

31. The method of claim 30 further comprising incrementing the game payout indicator while moving the at least one moveable physical element along the physical nonlinear path.

32. The method of claim 22 wherein the physical nonlinear path extends in three dimensions.

* * * * *